United States Patent

[11] 3,588,042

| [72] | Inventor | John L. Yopp |
| | | Homewood, Ill. |
| [21] | Appl. No. | 3,652 |
| [22] | Filed | Jan. 19, 1970 |
| [45] | Patented | June 28, 1971 |
| [73] | Assignee | Union Tank Car Company |

[54] TOP ENTRY BALL VALVE
7 Claims, 6 Drawing Figs.

[52] U.S. Cl. .................................................. 251/315,
251/317
[51] Int. Cl. ...................................................... F16k 5/06
[50] Field of Search ............................................ 251/315,
317

[56] References Cited
UNITED STATES PATENTS

| 3,058,484 | 10/1962 | Feiring | 251/315X |
| 3,132,836 | 5/1964 | Dickerson | 251/315X |
| 3,154,094 | 10/1964 | Dredtschneider | 251/315X |
| 3,498,585 | 3/1970 | Temple | 251/315 |

*Primary Examiner*—Harold W. Weakley
*Attorney*—Charles M. Kaplan

ABSTRACT: A ball valve having a partially spherical ball provided with an opening therethrough, which may be rotated to permit or to prevent the passage of fluid. A body has two longitudinally aligned fluid passages and a lateral opening communicating with a central space. A rotatable ball, having an opening communicable with the fluid passages, is positioned within the central space. A pair of annular seat rings, of wedge shape cross section, fit against and clampingly secure the ball therebetween. A pair of seat ring retainers, having sidewalls inclined downwardly and inwardly, wedge the ball and seat rings therebetween. Bonnet means selectively applies pressure to the seat rings and thereby compresses the seat rings to the ball and the retainer sidewalls.

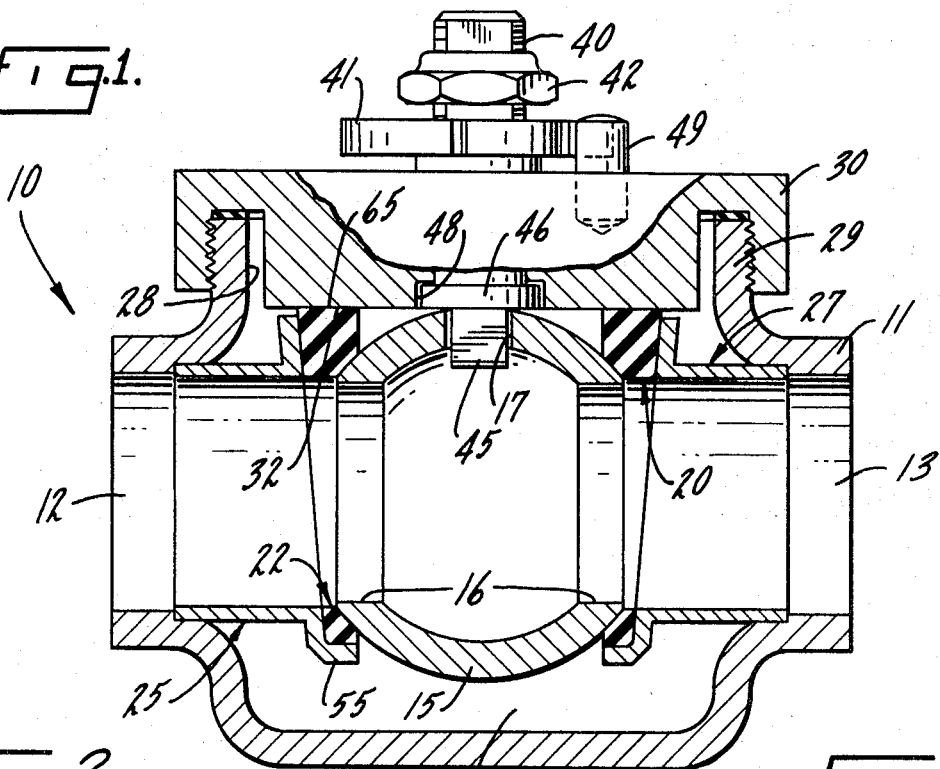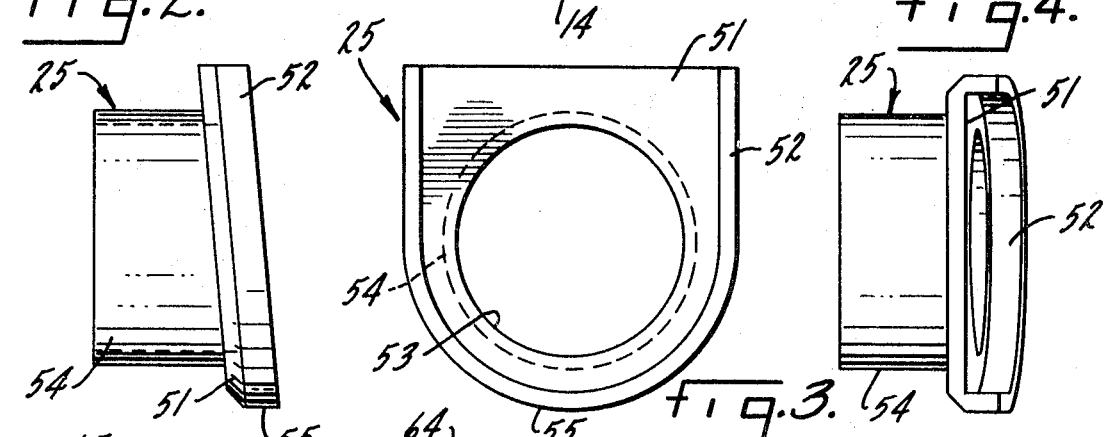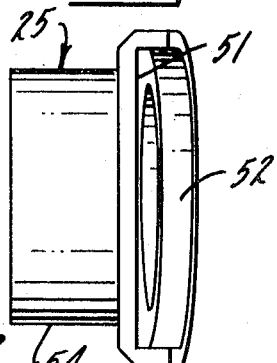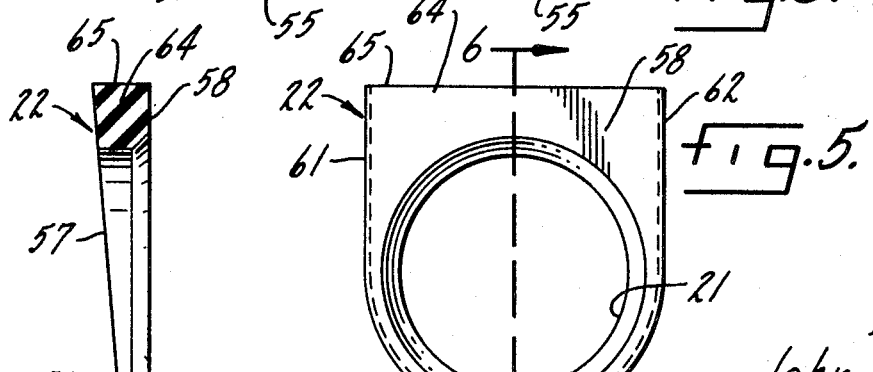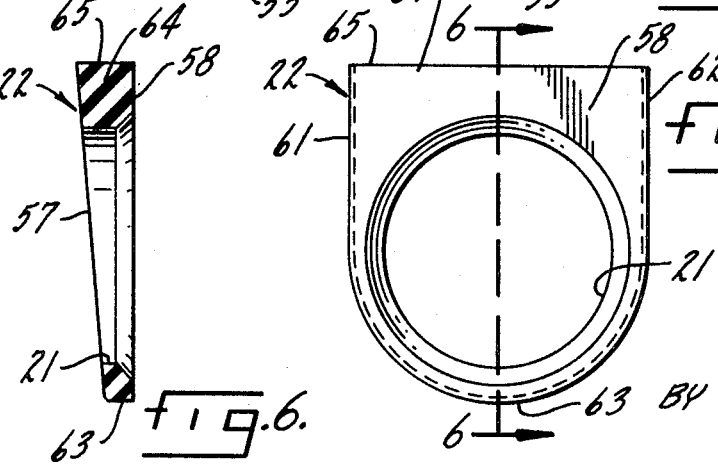

TOP ENTRY BALL VALVE

BACKGROUND OF THE INVENTION

This invention relates to ball valves, and more particularly to a valve having a partially spherical ball provided with an opening therethrough, which may be rotated to permit or to prevent the passage of fluid.

The conventional form of such a valve comprises a pair of flexible seat rings, one on each side of the ball, to form a seal on both the upstream and the downstream side. The valve chamber is of such a length as to produce initial defection of the rings. The casing is made in two sections which are assembled together endwise. When replacement of the rings is required, it is necessary to disconnect the valve from the pipe line in order to take the casing apart.

To solve this problem, it is known to provide a one-piece body with provisions at both ends for connection to piping. The body has a top opening to the valve chamber. The ball and seat rings are secured together between seat ring retainers by a linkage or spring means which permits the distance between the seat ring retainers to be varied. This assembly is inserted into the valve chamber through the top opening, with the seat ring retainers drawn close enough together to permit easy insertion into the chamber. The linkage or spring means is then adjusted so that the seat ring retainers bear on the endwalls of the chamber. A cover plate, which carries the bonnet and stem assembly, is attached to the valve body to cover the top opening.

Such valves, known as top entry ball valves, have facilitated the assembly, removal, and reassembly of the ball and its associated rings without removal of the valve body from the fluid line. But they require the addition of either an adjustable linkage or a spring means which are subject to malfunction, require care in assembly, and obviously increase the cost of manufacturing the valves. It is also necessary to provide cavities to support the linkage or springs which are costly and difficult to clean, especially if the fluid should be a syrup.

SUMMARY OF THE INVENTION

The general purpose of this invention is to provide a ball valve having all the advantages of similarly employed prior art devices and none of the above described disadvantages.

An object of the present invention is to provide a ball valve which permits ready assembly, removal and reassembly of the ball and its associated seat rings through the top of the valve without removing the valve body from the fluid line.

Another object is to provide a top entry ball valve that is of simple construction and does not require the use of an adjustable linkage or spring means.

A further object is to provide a top entry ball valve that is inexpensive to manufacture without sacrificing quality or reliability in operation.

To attain these and other objectives, the present invention provides a body having two longitudinally aligned fluid passages and a lateral opening communicating with a central space. A rotatable ball, having an opening communicable with the fluid passages, is positioned within the central space. A pair of annular seat rings of wedge shape cross section, fit against and clampingly secure the ball therebetween. A pair of seat ring retainers, having sidewalls inclined downwardly and inwardly, wedge the ball and seat rings therebetween. Bonnet means are provided to selectively apply pressure to the seat rings and thereby compress the seat rings to the ball and retainer sidewalls. A rotatable valve stem projects through the lateral opening and the bonnet means, and is connected to the ball to rotate the ball between positions of permitting and preventing the passage of fluid therethrough.

DESCRIPTION OF THE DRAWING

With these and other objects in view, as will hereinafter more fully appear, and which will be more particularly pointed out in the appended claims, reference is now made to the following description taken in connection with the accompanying drawings in which:

FIG. 1 is a partial sectional front elevational view of the improved valve, with the ball in the position permitting fluid passage, taken substantially on the longitudinal center line;

FIG. 2 is a front elevational view of the seat ring retainer of the invention;

FIG. 3 is a side elevational view of the seat ring retainer of the invention;

FIG. 4 is a top plan view of the seat ring retainer of the invention;

FIG. 5 is a side elevational view of the seat ring of the invention; and

FIG. 6 is a sectional view of the seat ring of FIG. 5 taken along section line 6—6.

DESCRIPTION OF THE PREFERRED EMBODIMENT

Referring to FIG. 1, valve 10 has a tubular body 11 formed with an inlet passage 12 and an outlet passage 13 extending in axial alignment, one with the other. Body 11 is pressure formed from one piece of tubular material to the shape as illustrated. Interposed between these passages is central space 14 containing ball valve member 15. A flow passage 16 is formed in member 15 to establish flow between inlet passage 12 and outlet passage 13 when the valve is in an open position, permitting fluid passage, e.g., as in FIG. 1. At opposite sides from passage 16, member 15 has a barrier wall portion of spherical form which prevents the flow between passages 12 and 13 when the valve is in the closed position.

The ball valve member 15 is mounted between two seat rings 20 and 22, either one or both may be made of an elastic material, such as a fairly stiff vulcanized rubber compound, or any other type material as may be required under various service conditions to hold pressure. The ball valve member 15 and seat rings 20 and 22 are supported by hollow seat ring retainers 25 and 27. As can be seen in FIG. 1 seat ring retainers 25 and 27 are in fluid communication with passages 12 and 13 respectively. The specific structural relationship between seat rings 20 and 22 and seat ring retainers 25 and 27 constitute an important part of the instant invention and will later be discussed in detail.

Body 11 has a lateral opening 28, through what may be considered the top of the body, through which ball valve member 15 and its associated seat rings 20 and 22 may be removed. Closing off opening 28 is a bonnet 30 which may be removably secured to the valve body in any conventional manner, i.e. by threadingly receiving upwardly projected flange 29. Bonnet 30 may also be removably secured to the body by conventional cap screws.

A stem 40, to which is suitably secured stop plate 41 by means of a lock nut 42, has at its lower end a downwardly projecting lug 45 adapted to engage a shallow slot 17 in the top of the ball valve member. This stem and the interconnecting lug and slot constitute means for rotating ball 15 about a vertical axis. Stem 40 has an annular flange 46 at its lower end which is shaped to provide the lug 45. The upper portion of stem 40 passes through a suitable cylindrical hole 48 in the bonnet having a diameter less than the diameter of annular flange 46. Thus, by removal of the bonnet 30, access may be had to the ball valve 15 and its associated seat rings 20 and 22. Stop plate 41 may be provided with a downwardly extending follower 49 which is received by a quarter circle groove in the bonnet to prevent the stem form rotating greater than 90°.

This invention deals primarily with the structural relationship between seat rings 20 and 22 and seat ring retainers 25 and 27. As can be seen in FIGS. 2—4 seat ring retainer 25 is composed of a cylindrical section 54 mounted at one end in fluid communication with passageway 12. The other end of cylindrical section 54 is attached to a horseshoe shaped section 51 having an aperture 53 in fluid communication with section 54. As can be seen in FIGS. 1—2, section 51 is inclined downwardly and inwardly approximately 5° from the vertical for reasons which will soon be come more apparent. Inwardly extending lip 52 is positioned substantially perpendicular to and extends about the side and lower outer periphery of section 51. Lip 52 forms a pocket in which seat ring 22 is positioned. Seat ring retainer 27 is identical to seat ring retainer 25 and is in fluid communication with passageway 13 and receives seat ring 20.

Seat ring 22, as illustrated in FIGS. 5—6, includes sidewalls 57 and 58, front and rear walls 61 and 62, bottom wall 63 and top wall 64. Front and rear walls 61 and 62 are substantially vertical and are connected together by curved bottom wall 63 and substantially horizontal top wall 64. Top wall 64 has a horizontal upper flat edge 65. Seat ring 22 has an aperture 21 therein in fluid communication with aperture 53. As seen in FIG. 6, sidewalls 57 is inclined downwardly and inwardly approximately 5° from the vertical. The outer periphery of aperture 21 has beveled edges to facilitate receipt of ball 15. Seat ring 22 is positioned in the pocket formed by lip 52 of seat ring retainer 25 with sidewall 57 being adjacent section 51. Seat ring 20 is identical to seat ring 22 and is positioned with respect to seat ring retainer 27 in a similar manner.

Bonnet 30 is secured to body by above seat rings 20 and 22 by vertically adjustable means, such that it can apply a mechanical force to the upper flat edges of the seat rings, thereby, compressing the seat rings to the ball and seat ring retainers. As seen in FIG. 1 bonnet 30 is threadingly received BY upwardly projecting flange 29 and may be vertically adjusted with respect to the body by merely rotating same about a vertical axis. The bottom portion 32 of the bonnet is positioned with respect to the seat rings so as to increase or decrease the pressure applied to the upper flat edges of the seat rings by lowering or raising the bonnet. The bonnet is removable from the body thereby allowing easy access and removal of the ball and seat rings.

To assemble the valve, an assembled unit, consisting of ball 15 and seat rings 20 and 22, is assembled outside the valve body. The assembled unit is then inserted through lateral opening 28 into central space 14. As shown in FIG. 1, the assembled unit is wedgeably received between seat ring retainers 25 and 27. The seat rings are positioned within the pockets defined by the seat ring retainer lips 52. It should be noted that the pockets have a lower support ledge 55 which defines the lowest point of entry of the seat rings and thereby facilitates compression of the seat rings.

To complete the valve assembly, the bonnet 30, having the stem 40 secured thereto, is secured to the body by threaded flange 29. Rotation of bonnet 30 about flange 29 results in a downward movement of the bonnet thereby applying a mechanical force to the top of the seat rings thus wedging the assembled unit between the seat ring retainers.

If replacement of the seat rings 20 and 22 becomes necessary, the bonnet 30 is removed and the assembled unit, consisting of the ball and seat rings, may be drawn out through opening 28. After the seat rings have been replaced, the assembled unit is returned to the body in the manner as in originally assembling the valve. This repair can be performed without disconnecting the body from the pipe line.

The ball valve of the instant invention permits ready assembly, removal and reassembly of the ball and its associated seat rings through the top of the valve without removing the valve body from the fluid line. This is all attained without the use of costly and unreliable linkages and springs.

Various modificatons are contemplated and may obviously be resorted to by those skilled in the art without departing from the spirit and scope of the invention, as hereinafter defined by the appended claims, as only a preferred embodiment thereof has been disclosed.

I claim:

1. A ball valve comprising:
   a. a body having two longitudinally aligned fluid passages and a lateral opening communicating with a central space;
   b. a rotatable ball positioned within said central space and having an opening therethrough communicable with said fluid passages;
   c. annular seat rings, of wedge shape cross section, positioned against and clampingly securing said ball therebetween;
   d. seat ring retainers, secured to said body, having flow openings aligned with said fluid passages, said seat ring retainers further having side walls inclined downwardly and inwardly towards each other, said ball and said seat rings being wedgeably received between said side walls;
   e. bonnet means releasably secured to said body so as to selectively apply pressure to an upper portion of said seat rings and thereby compress said seat rings to said ball and said ring retainer sidewalls; and
   f. a rotatable valve stem, projecting through said lateral opening and said bonnet means, connected to said ball to rotate the ball between positions of permitting and preventing the passage of fluid therethrough.

2. A ball valve as in claim 1 wherein an assembled unit of said seat rings and said ball therebetween may be removed through said lateral opening upon removal of said bonnet means.

3. A ball valve as in claim 1 wherein said seat ring retainer sidewalls are horseshoe shaped and have inwardly extending lips, substantially perpendicular to and extending about the side and lower periphery of said sidewalls, and said seat rings are positioned within the pockets defined by said lips.

4. A ball valve as in claim 1 wherein said seat rings are of horseshoe shape and have a sidewall inclined downwardly and inwardly approximately 5° from the vertical.

5. A ball valve comprising:
   a. a body having two longitudinally aligned fluid passages and a lateral opening communicating with a central space;
   b. a rotatable ball positioned within said central space and having an opening therethrough communicable with said fluid passages;
   c. annular seat rings positioned against and clampingly securing said ball therebetween, said seat rings being of horse-shoe shape and have a sidewall inclined downwardly and inwardly approximately 5° from the vertical;
   d. seat ring retainers secured to said body having flow openings aligned with said fluid passages, said seat ring retainers including horseshoe shaped sidewalls inclined downwardly and inwardly approximately 5° from the vertical and having inwardly extending lips substantially perpendicular to and extending about the side and lower periphery of said sidewalls defining pockets therein;
   e. said seat rings being wedgeably received within said pockets such that said seat sidewall wall is adjacent said seat ring retainer sidewall;
   f. bonnet means releasably secured to said body so as to selectively apply pressure to an upper portion of said seat rings and thereby compress said seat rings to said ball and said ring retainer sidewalls; and
   g. a rotatable valve stem, projecting through said lateral opening and said bonnet means, connected to said ball to rotate the ball between positions of permitting and preventing the passage of fluid therethrough.

6. A ball valve as in claim 1 wherein said seat ring retainer sidewalls have inwardly extending lips about the side and lower periphery thereof, and said seat rings are positioned within the pockets defined by said lips.

7. A ball valve as in claim 1 wherein said seat rings have a sidewall inclined downwardly and inwardly approximately 5° from the vertical.

PO-1050
(5/69)

UNITED STATES PATENT OFFICE
CERTIFICATE OF CORRECTION

Patent No. 3,588,042　　　　　Dated June 28, 1971

Inventor(s) John L. Yopp

It is certified that error appears in the above-identified patent and that said Letters Patent are hereby corrected as shown below:

Column 2, line 63, change "form" to -- from --.

Column 3, line 19, change "by" to -- 11 -- .

Column 3, line 24, change "BY" to -- by -- .

Column 4, line 52, after "seat" insert -- ring -- .

Column 4, line 52, delete "wall" .

Signed and sealed this 28th day of December 1971.

(SEAL)
Attest:

EDWARD M.FLETCHER,JR.　　　　ROBERT GOTTSCHALK
Attesting Officer　　　　　　　Acting Commissioner of Patents